(12) United States Patent
Yu et al.

(10) Patent No.: US 12,473,612 B2
(45) Date of Patent: Nov. 18, 2025

(54) LITHIUM-SODIUM SEPARATION METHOD

(71) Applicant: SUNRESIN NEW MATERIALS CO. LTD., Shaanxi (CN)

(72) Inventors: Jia Yu, Shaanxi (CN); Fumin Guo, Shaanxi (CN); Suidang Li, Shaanxi (CN); Qiong Liu, Shaanxi (CN); Xiaokang Kou, Shaanxi (CN)

(73) Assignee: SUNRESIN NEW MATERIALS CO., LTD., Shaanxi (CN)

( * ) Notice: Subject to any disclaimer, the term of this patent is extended or adjusted under 35 U.S.C. 154(b) by 665 days.

(21) Appl. No.: 17/792,624

(22) PCT Filed: Dec. 16, 2020

(86) PCT No.: PCT/CN2020/136822
§ 371 (c)(1),
(2) Date: Jul. 13, 2022

(87) PCT Pub. No.: WO2021/143434
PCT Pub. Date: Jul. 22, 2021

(65) Prior Publication Data
US 2023/0017362 A1    Jan. 19, 2023

(30) Foreign Application Priority Data

Jan. 15, 2020   (CN) .......................... 202010043101.2

(51) Int. Cl.
C22B 26/12      (2006.01)
B01J 39/04      (2017.01)
(Continued)

(52) U.S. Cl.
CPC .............. C22B 26/12 (2013.01); B01J 39/04 (2013.01); B01J 39/18 (2013.01); B01J 47/02 (2013.01);
(Continued)

(58) Field of Classification Search
CPC .. C22B 26/12; C22B 3/42; C22B 3/24; C22B 26/10; B01J 39/04; B01J 39/18;
(Continued)

(56) References Cited

U.S. PATENT DOCUMENTS

2005/0269268 A1   12/2005   Hotier
2019/0248066 A1    8/2019   Featherstone

FOREIGN PATENT DOCUMENTS

CN      1452513 A      10/2003
CN      1714915 A       1/2006
(Continued)

OTHER PUBLICATIONS

Translation of CN_105797428 (Jul. 27, 2016).*
(Continued)

Primary Examiner — Daniel C. McCracken
Assistant Examiner — Joshua Maxwell Speer
(74) Attorney, Agent, or Firm — DINSMORE & SHOHL LLP

(57) ABSTRACT

Disclosed is a new continuous lithium-sodium separation method. A lithium-sodium separation mother solution, a first leacheate, a desorption solution, a second leacheate and a lithium-sodium separation adsorption tail solution respectively pass through a lithium-sodium separation mother solution feeding pipe (2), a first leacheate feeding pipe (3), a desorption solution feeding pipe (4), a second leacheate feeding pipe (5) and an adsorption tail solution top desorption solution feeding pipe (6) that are located above and below a rotary disc of a multi-way change-over valve system (1), respectively enter corresponding resin columns (7) by means of pore channels and channels in the multi-way change-over valve system (1), and then are discharged from an adsorption tail solution discharging pipe (8), a first leacheate discharging pipe (9), a qualified liquid discharging
(Continued)

pipe (10), a second leacheate discharging pipe (11) and an adsorption tail solution top desorption solution discharging pipe (12), so as to complete the whole technological process, wherein the resin columns (7) are connected in series or in parallel by means of the channels located in the multi-way change-over valve system (1). The method is simple and easy to operate, the resin utilization rate is improved by 20% or more, the efficiency is improved by 40% or more, and the production cost can be reduced by 30-50%. The production reliability is improved, and all-year continuous operation can be realized.

16 Claims, 2 Drawing Sheets

(51) Int. Cl.
 B01J 39/18 (2017.01)
 B01J 47/02 (2017.01)
 B01J 49/53 (2017.01)
 B01J 49/60 (2017.01)
 C01D 15/00 (2006.01)
 C22B 3/42 (2006.01)
(52) U.S. Cl.
 CPC ............... B01J 49/53 (2017.01); B01J 49/60 (2017.01); C01D 15/00 (2013.01); C22B 3/42 (2013.01)
(58) Field of Classification Search
 CPC . B01J 47/02; B01J 49/53; B01J 49/60; C01D 15/00; B01D 15/1864; Y02P 10/20
 See application file for complete search history.

(56) References Cited

FOREIGN PATENT DOCUMENTS

| CN | 102031368 | A |   | 4/2011  |             |
|----|-----------|---|---|---------|-------------|
| CN | 105797428 | A | * | 7/2016  | B01D 15/361 |
| CN | 106501429 | A |   | 3/2017  |             |
| CN | 107058735 | A |   | 8/2017  |             |
| CN | 108439432 | A |   | 8/2018  |             |
| CN | 108893605 | A | * | 11/2018 | C22B 3/42   |
| CN | 109336858 | A |   | 2/2019  |             |
| CN | 111197123 | A |   | 5/2020  |             |
| CN | 111971234 | A |   | 11/2020 |             |
| EP | 2960209   | B1|   | 12/2015 |             |
| WO | 02/30570  | A |   | 4/2002  |             |

OTHER PUBLICATIONS

Translation of CN_108893605 (Nov. 27, 2018).*
First Office Action of Corresponding CL Application No. 202201914 dated Mar. 18, 2024, 25 pages.
Second Office Action of Corresponding CL Application No. 202201914 dated Sep. 16, 2024, 31 pages.
First Office Action of Corresponding TR Application No. 2022/010650 dated Sep. 11, 2024, 3 pages.
Supplemental European Search Report, EP 20 91 4394, dated Apr. 4, 2023, 4 pages.
First Office Action from corresponding EP Application, 20 914 394.0, dated May 15, 2023, 48 pages.
International Search Report, PCT/CN2020/136822, dated Mar. 22, 2021, 5 pages.
Written Opinion of PCT/CN2020/136822, dated, Mar. 22, 2021.
First Office Action of CN202010043101.2, Application No. 2021052002025810 dated May 25, 2021, 7 pages.
Second Office Action of CN202010043101.2, Application No. 2022011301885620 dated Jan. 18, 2022, 5 pages.
Decision of Refusal of corresponding CN application CN202010043101. 2, dated Jun. 7, 2022, 4 pages.

* cited by examiner

LITHIUM-SODIUM SEPARATION METHOD

TECHNICAL FIELD

The invention relates to a new method for lithium-sodium separation, in particular to a continuous ion exchange device that absorbs lithium ions from a sodium chloride-containing solution and a continuous ion exchange method utilizing the device to absorb lithium ions from sodium chloride solution, which belongs to the field of hydrometallurgy.

BACKGROUND

In the lithium carbonate production technology, whether it is the salt lake lithium extraction technology or the ore lithium extraction technology, it is necessary to use sodium carbonate for lithium carbonate precipitation, the supernatant after precipitation contains about 2 g/L of lithium ion and 40 g/L of sodium ion. If it needs to be processed into lithium carbonate, hot water is also needed to wash the lithium carbonate. The lithium ion concentration in the washing water is about 2 g/L, and the sodium ion is 5 g/L. The two kinds of loss account for about 10% to 40% of the lithium carbonate production process. Therefore, recovering lithium from the above two part solutions can greatly improve the yield in the production process of lithium carbonate and reduce the production cost.

Most of the current processes are to add hydrochloric acid to adjust the pH to neutrality, increase the concentration of lithium ions and sodium ions to the crystallization of sodium chloride through an evaporator or open air, and then use sodium carbonate to precipitate lithium ions. The prior art has the following shortcomings: 1) Lithium and sodium cannot be completely separated and post-processing is also required; and 2) The recovery rate is low, and the recovery rate is only 50%.

CN1452513A discloses a fluid treating device, which comprises a distributing device with a revolving disc in a stationary housing, and a motor for rotating the revolving disc, through the feeding pipe and the discharging pipe contained on the distributing device to contact with the solid material inside the container, thereby realizing the fluid treatment process. The method mainly proposes a device structure and fluid distribution method, but does not involve a specific production process and method, and has no operability and production practice.

SUMMARY OF THE INVENTION

In order to solve the problems in the prior art, the present invention provides a new method for lithium-sodium separation.

The method of the invention adopts a lithium-sodium separation device to recover the lithium in the lithium-sodium solution in the lithium carbonate production process. In the process of use, series or parallel connected multiple columns are combined with the switching mode of a multi-way switching valve, so that quick separation of lithium and sodium can be realized when the material liquid flows through the bed. During the whole process, the steps of adsorption, first washing, desorption, second washing and pushing back water by adsorption barren liquid are run simultaneously through automatic control. The above method can effectively realize separation of lithium and sodium, the operation is simple, the operation cost is low, the production efficiency is high, and the yield can reach more than 95%.

For realizing the above-mentioned technical purpose, the present invention adopts the following technical solutions: allowing a lithium-sodium separation feed solution, first drip washing solution, desorption solution, second drip washing solution and lithium-sodium separation adsorption barren liquid to pass through a feeding pipe for lithium-sodium separation feed solution, a feeding pipe for first drip washing solution, a feeding pipe for desorption solution, a feeding pipe for second drip washing solution, a feeding pipe for adsorption barren liquid for pushing back desorption solution respectively, wherein the feeding pipes are located above and below a rotary disc of a multi-way switching valve system, then pass through openings and channels within the multi-way switching valve system to respectively enter corresponding resin columns, and finally discharge from a discharging pipe for adsorption barren liquid, a discharging pipe for first drip washing solution, a discharging pipe for qualified solution, a discharging pipe for second drip washing solution, a discharging pipe for adsorption barren liquid for pushing back desorption solution, thereby completing the whole process. The resin columns are connected in series or in parallel via the channels in the multi-way switching valve system.

The whole process comprises the following steps:
(1) in an adsorption zone, carrying out: feeding the lithium-sodium separation feed solution from a tank for lithium-sodium separation feed solution into a resin column N1 through the feeding pipe for lithium-sodium separation feed solution to perform adsorption of lithium ions onto resin, producing a lithium-sodium separation barren liquid after the adsorption of lithium ions, and discharging the lithium-sodium separation barren liquid into a tank for barren liquid through the discharging pipe for adsorption barren liquid;
(2) in a first washing zone, carrying out the following after the resin is saturated: feeding the first drip washing solution from a tank for the first drip washing solution into a resin column N2 through the feeding pipe for first drip washing solution to push back the lithium-sodium separation feed liquid in which lithium ions are not adsorbed to the tank for lithium-sodium separation feed liquid to wait for the next adsorption;
(3) in a desorption zone, carrying out the following after the completion of first washing: feeding a desorption solution from a tank for desorption solution into a resin column N3 through the feeding pipe for desorption solution to desorb lithium ions adsorbed on the resin, and discharging the desorbed lithium ion-rich desorption liquid into a tank for qualified desorption liquid through the discharging pipe for qualified solution;
(4) in a second washing zone, carrying out the following after the desorption is completed: feeding the second drip washing solution from a tank for second drip washing solution into a resin column N4 through the feeding pipe for second drip washing solution to push back the unused desorption liquid in the resin column to the tank for desorption liquid to wait for use in the next desorption step;
(5) in a zone for pushing back water by adsorption barren liquid, carrying out the following after the completion of second washing: feeding the lithium-sodium separation adsorption barren liquid from the feeding pipe for adsorption barren liquid into a resin column N5 to replace the second drip washing solution in the resin column and loose the resin, and recycling the replaced second drip washing solution to a tank for second drip washing solution through the discharging pipe for second drip washing solution to wait for use in the next second washing step; and (6) setting a rotation time of the multi-way switching valve to realize shift of columns according to the process requirements.

The resin columns N1, N2, N3, N4 and N5 are one or more resin columns connected in series or parallel mode, and the number of the resin columns N1, N2, N3, N4 and N5 can be matched with the channels of the multi-way switching valve system according to process requirements. The resin columns are filled with macroporous adsorption resins.

The first drip washing solution is selected from the group consisting of pure water, 0.1-50% (w/w) saline solution, 0.1-36% (w/w) hydrochloric acid solution, 0.1-50% (w/w) sodium hydroxide solution, and any mixture thereof. Preferably, the first drip washing solution is one of pure water, 0.2-0.6% (w/w) saline solution, 0.1-0.6% (w/w) hydrochloric acid solution and 0.1-0.6% (w/w) sodium hydroxide solution. More preferably, the first drip washing solution is pure water or 0.5% (w/w) hydrochloric acid solution. Most preferably, the first drip washing solution is pure water.

The desorption solution is selected from the group consisting of ethanol, methanol, acetone, isopropanol, hydrochloric acid solution, sulfuric acid solution, phosphoric acid solution, acetic acid solution, EDTA solution, sodium hydroxide solution, and any mixture thereof. Preferably, the desorption solution is 2-10% (w/w) hydrochloric acid solution or 5-15% (w/w) sulfuric acid solution. More preferably, the desorption solution is 4-10% (w/w) hydrochloric acid solution or 8-15% (w/w) sulfuric acid solution. Most preferably, the desorption solution is 8% (w/w) hydrochloric acid solution or 10% (w/w) sulfuric acid solution.

The second drip washing solution is selected from the group consisting of pure water, 0.1-50% (w/w) saline solution, 0.1-36% (w/w) hydrochloric acid solution, 0.1-50% (w/w) sodium hydroxide solution, and any mixture thereof. Preferably, the second drip washing solution is one of pure water, 0.2-0.6% (w/w) saline solution, 0.1-0.6% (w/w) hydrochloric acid solution and 0.1-0.6% (w/w) sodium hydroxide solution. More preferably, the second drip washing solution is pure water or 0.5% (w/w) hydrochloric acid solution. Most preferably, the second drip washing solution is pure water.

The rotation shift time of the multi-way switching valve system is 0.01-24 hours.

The most preferred technical solution of the present invention comprises the following steps:

(1) feeding the lithium-sodium separation feed solution at a flow rate of 5 BV/h into the resin column N1 of the multi-way switching valve device to perform adsorption of lithium in the feed liquid by the resin in the resin column, and discharging out the resulted adsorption barren liquid from the device;

(2) after the resin is saturated, feeding pure water at a flow rate of 2 BV/h into the resin column N2 to push back the lithium-sodium separation feed liquid in which lithium ions are not adsorbed to the tank for lithium-sodium separation feed liquid to wait for the next adsorption;

(3) after the washing with pure water is completed, feeding 8% (w/w) hydrochloric acid solution at a flow rate of 2 BV/h into the resin column N3 to desorb lithium ions adsorbed on the resin, and discharging the desorbed lithium ion-rich desorption liquid into a tank for qualified desorption liquid;

(4) after the desorption is completed, pushing back the unused desorption liquid in the resin column N4 using pure water to the tank for desorption liquid to wait for use in the next desorption step; and (5) setting the multi-way switching valve to have a shift time of 30 min.

The invention provides a new method for lithium-sodium separation, which innovatively proposes a new method for continuous lithium-sodium separation by combining a multi-way switching valve continuous adsorption system with a lithium-sodium separation resin process. Compared with the fixed bed operation system, the method of the invention utilizes the simple and easy-to-operate characteristics of the multi-way switching valve equipment, and combines the process particularity of lithium-sodium separation, wherein the resin utilization rate is improved by 20% or more, the resin efficiency is improved by 40% or more, and the production cost can be reduced by 30-50%. In addition, the multi-way switching valve system adopts full sealing and interval operation of pushing back water by lithium-sodium separation feed solution and materials, which reduces water consumption and waste water discharge during the entire operation process, improves production reliability and can achieve year-round no-stop operation.

DETAILED DESCRIPTION

In order to make the content of the present invention easier to understand clearly, the present invention will be described in further detail below according to specific embodiments of the present invention and in conjunction with the accompanying drawings.

Figure 1:
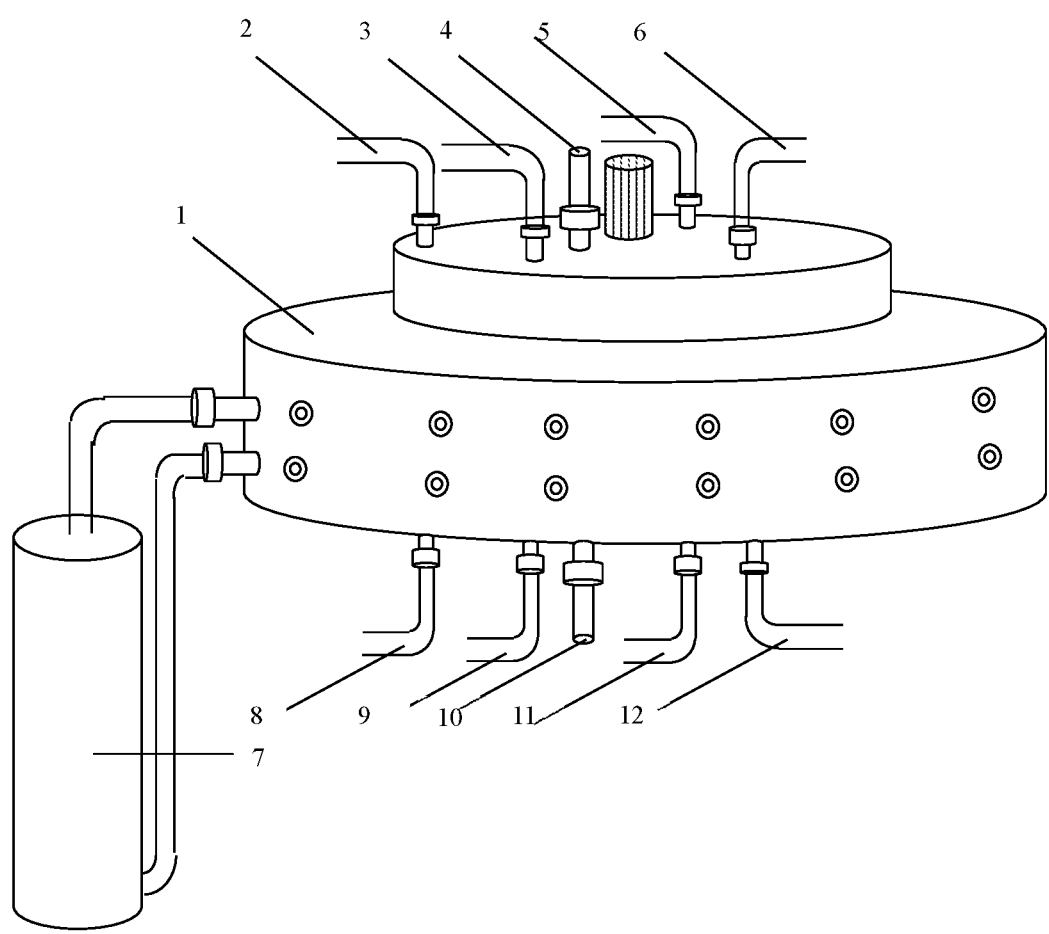
FIG. 1 is a schematic diagram of inlet and outlet pipelines of the multi-way switching valve system.

FIG. 1 is a schematic diagram of inlet and outlet pipelines of a multi-way switching valve system, wherein:
1. multi-way switching valve system;
2. feeding pipe for lithium-sodium separation feed solution;
3. feeding pipe for first drip washing solution;
4. feeding pipe for desorption solution;
5. feeding pipe for second drip washing solution;
6. discharging pipe for adsorption barren liquid for pushing back second drip washing solution;
7. resin column;
8. discharging pipe for adsorption barren liquid;
9. discharging pipe for first drip washing solution;
10. discharging pipe for qualified solution;
11. discharging pipe for second drip washing solution;
12. feeding pipe for adsorption barren liquid for pushing back second drip washing solution.

Figure 2:
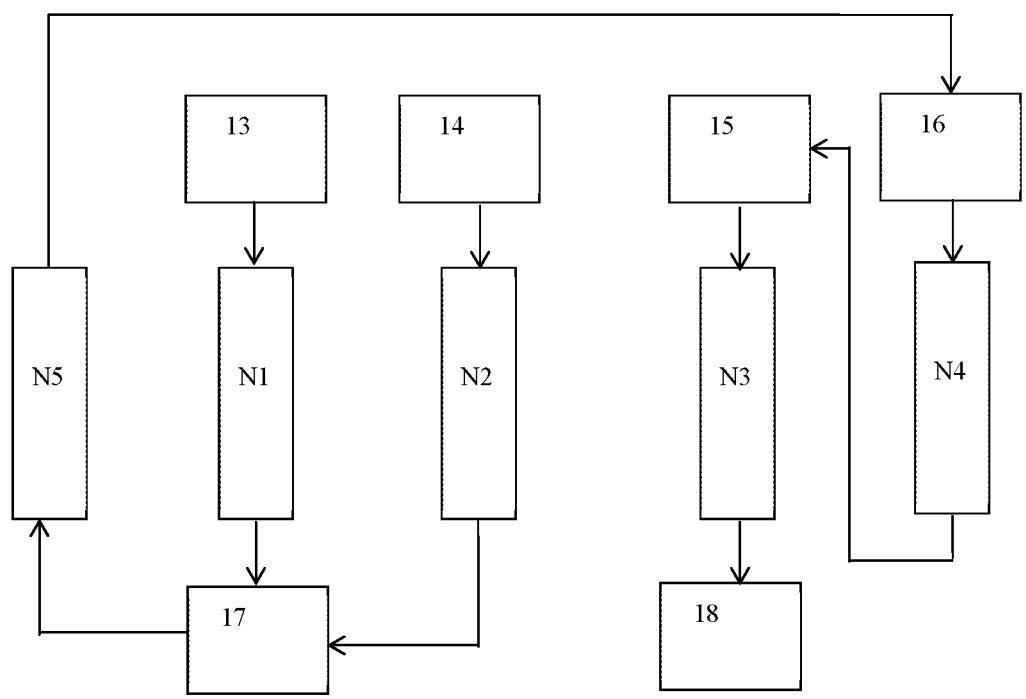
FIG. 2 is a schematic diagram of process flow of lithium-sodium separation.

FIG. 2 is a schematic diagram of process flow of lithium-sodium separation, wherein:
13. tank for lithium-sodium separation feed solution;
14. tank for first drip washing solution;
15. tank for desorption solution;
16. tank for second drip washing solution;
17. tank for barren liquid;
18. tank for qualified solution;
N1, N2, N3, N4 and N5: resin columns.

The technical solution of the present invention will be described in detail below with reference to specific embodiments.

Example 1

A lithium-sodium separation feed solution, water as first drip washing solution, 8% (w/w) hydrochloric acid solution as desorption solution and water as second drip washing solution were passed through a feeding pipe 2 for lithium-sodium separation feed solution, a feeding pipe 3 for first drip washing solution, a feeding pipe 4 for desorption solution, a feeding pipe 5 for second drip washing solution, a feeding pipe 12 for adsorption barren liquid for pushing back washing solution respectively, wherein the feeding pipes were located above and below a rotary disc of a multi-way switching valve system 1 (with a valve diameter of 1.5 inches, a rotation shift time of 1 h), then passed through openings and channels within the multi-way switching valve system to respectively enter corresponding resin columns 7 (filled with macroporous adsorption resin LX-20 for lithium-sodium separation, produced by XI'AN SUN-RESIN NEW MATERIALS CO., LTD.), and finally discharged from a discharging pipe 8 for adsorption barren liquid, a discharging pipe 9 for first drip washing solution, a discharging pipe 10 for qualified solution, a discharging pipe 11 for second drip washing solution, a discharging pipe 12 for adsorption barren liquid for pushing back second drip washing solution, thereby completing the whole process.

The distribution of each zone was as follows:

1. Adsorption zone: the lithium-sodium separation feed solution from a tank 13 for lithium-sodium separation feed solution and the feeding pipe 2 for lithium-sodium separation feed solution entered resin columns 4 #, 5 #and 6 #(resin columns 4 #, 5 #and 6 #operated in series through the channels in the multi-way switching valve, forming a resin column N1), so that lithium ions were adsorbed on the resin, and the lithium-sodium separation adsorption barren liquid after the adsorption of lithium ions was discharged into a tank 17 for barren liquid through a discharging pipe 8 for adsorption barren liquid.

2. First washing zone: after the resin was saturated: the first drip washing solution from a tank 14 for the first drip washing solution entered resin columns 1 #, 2 #and 3 #(resin columns 1 #, 2 #and 3 #operated in series through the channels in the multi-way switching valve, forming a resin column N2) through the feeding pipe 3 for first drip washing solution to push back the lithium-sodium separation feed liquid in which lithium ions were not adsorbed to the tank 13 for lithium-sodium separation feed liquid to wait for the next adsorption.

3. Desorption zone: after the completion of first washing, the desorption solution from a tank 15 for desorption solution entered resin columns 11 #, 12 #, 13 #, 14 #and 15 #(resin columns 11 #, 12 #, 13 #, 14 #and 15 #operated in series through the channels in the multi-way switching valve, forming a resin column N3) through the feeding pipe 4 for desorption solution to desorb lithium ions adsorbed on the resin, and the desorbed lithium ion-rich desorption liquid was discharged into a tank 18 for qualified desorption liquid through the discharging pipe 10 for qualified solution.

4. Second washing zone: after the resin desorption was completed, the second drip washing solution from a tank 16 for second drip washing solution entered resin columns 8 #, 9 #and 10 #(resin columns 8 #, 9 #and 10 #operated in series through the channels in the multi-way switching valve, forming a resin column N4) through the feeding pipe 5 for second drip washing solution to recycle the unused desorption liquid in the resin column to the tank 15 for desorption liquid.

5. Zone for pushing back water by adsorption barren liquid: after the desorption was completed, the lithium-sodium separation adsorption barren liquid entered resin column 7 #(i.e. resin column N5) through feeding pipe 12 for adsorption barren liquid for pushing back second drip washing solution, the second drip washing solution in the resin column was replaced and the resin was loosened, and the replaced second drip washing solution was recycled to a tank 16 for second drip washing solution through the discharging pipe 6 for second drip washing solution.

The system had a feed flow rate of 2 t/h for the lithium-sodium separation feed solution, fifteen resin columns in total, with each column being filled with 1 $m^3$ of resin and the total amount of resin in the system being 15 $m^3$, and a switching time of 1 h. The lithium-sodium separation feed solution at inlet had a lithium ion content of 2000 ppm. After treatment by the system, the adsorption tail fluid in the lithium-sodium separation feed solution had a lithium ion content of 67 ppm, the recovery rate of lithium ion was 96.65%, and the lithium ion concentration of the qualified desorption liquid was 1 g/L. For comparison, a fixed bed system had a feed flow rate of 15 t/h, three resin columns in total, with each column being filled with 20 $m^3$ of resin and the total amount of resin in the system being 60 $m^3$, a lithium content of 2000 ppm at inlet. After treatment by the fixed bed system, the adsorption barren liquid in the lithium-sodium separation feed solution had a lithium ion content of 430 ppm, and the qualified desorption solution had a lithium ion concentration of 0.4 g/L.

Example 2

A lithium-sodium separation feed solution, pure water as first drip washing solution, 4% (w/w) hydrochloric acid solution as desorption solution and pure water as second drip washing solution were passed through a feeding pipe 2 for lithium-sodium separation feed solution, a feeding pipe 3 for first drip washing solution, a feeding pipe 4 for desorption solution, a feeding pipe 5 for second drip washing solution, a feeding pipe 12 for adsorption barren liquid for pushing back washing solution respectively, wherein the feeding pipes were located above and below a rotary disc of a multi-way switching valve system 1 (with a valve diameter of 1.5 inches, a rotation switching time of 2 h), then passed through openings and channels within the multi-way switching valve system to respectively enter corresponding resin columns 7 (filled with macroporous adsorption resin LX-20 for lithium-sodium separation, produced by XI'AN SUN-RESIN NEW MATERIALS CO., LTD.), and finally discharged from a discharging pipe 8 for adsorption barren liquid, a discharging pipe 9 for first drip washing solution, a discharging pipe 10 for qualified solution, a discharging pipe 11 for second drip washing solution, a discharging pipe 12 for adsorption barren liquid for pushing back second drip washing solution, thereby completing the whole process.

The distribution of each zone was as follows:

1. Adsorption zone: the lithium-sodium separation feed solution from a tank 13 for lithium-sodium separation feed solution and the feeding pipe 2 for lithium-sodium separation feed solution entered resin columns 5 #, 6 #and 7 #(resin columns 5 #, 6 #and 7 #operated in series through the channels in the multi-way switching valve, forming a resin column N1), so that lithium ions were adsorbed on the resin, and the adsorption barren liquid after the adsorption of lithium ions was discharged into a tank 17 for barren liquid through a discharging pipe 8 for adsorption barren liquid.

2. First washing zone: after the resin was saturated: the first drip washing solution from a tank 14 for the first drip washing solution entered resin columns 2 #, 3 #and 4 #(resin columns 2 #, 3 #and 4 #operated in series through the channels in the multi-way switching valve, forming a resin column N2) through the feeding pipe 3 for first drip washing solution to push back the lithium-sodium separation feed liquid in which lithium ions were not adsorbed to the tank 13 for lithium-sodium separation feed liquid to wait for the next adsorption.

3. Desorption zone: after the completion of first washing, the desorption solution from a tank 15 for desorption solution entered resin columns 12 #, 13 #, 14 #, 15 #and 1 #(resin columns 12 #, 13 #, 14 #, 15 #and 1 #operated in series through the channels in the multi-way switching valve, forming a resin column N3) through the feeding pipe 4 for desorption solution to desorb lithium ions adsorbed on the resin, and the desorbed lithium ion-rich desorption liquid was discharged into a tank 18 for qualified desorption liquid through the discharging pipe 10 for qualified solution.

4. Second washing zone: after the resin desorption was completed, the second drip washing solution from a tank 16 for second drip washing solution entered resin columns 9 #, 10 #and 11 #(resin columns 9 #, 10 #and 11 #operated in series through the channels in the multi-way switching valve, forming a resin column N4) through the feeding pipe 5 for second drip washing solution to recycle the unused desorption liquid in the resin column to the tank 15 for desorption liquid.

5. Zone for pushing back water by adsorption barren liquid: after the desorption was completed, the lithium-sodium separation adsorption barren liquid entered resin column 8 #(i.e. resin column N5) through feeding pipe 12 for adsorption barren liquid for pushing back second drip washing solution, the second drip washing solution in the resin column was replaced and the resin was loosened, and the replaced second drip washing solution was recycled to a tank 16 for second drip washing solution through the discharging pipe 6 for second drip washing solution.

The system had a feed flow rate of 2 t/h for the lithium-sodium separation feed solution, fifteen resin columns in total, with each column being filled with 1 m$^3$ of resin and the total amount of resin in the system being 15 m$^3$, and a switching time of 2 h. The lithium-sodium separation feed solution at inlet had a lithium ion content of 2000 ppm. After treatment by the system, the adsorption tail fluid in the lithium-sodium separation feed solution had a lithium ion content of 47 ppm, the recovery rate of lithium ion was 97.65%, and the lithium ion concentration of the qualified desorption liquid was 0.67 g/L.

Example 3

A lithium-sodium separation feed solution, pure water as first drip washing solution, 12% (w/w) hydrochloric acid solution as desorption solution, desorption solution and pure water as second drip washing solution were passed through a feeding pipe 2 for lithium-sodium separation feed solution, a feeding pipe 3 for first drip washing solution, a feeding pipe 4 for desorption solution, a feeding pipe 5 for second drip washing solution, a feeding pipe 12 for adsorption barren liquid for pushing back washing solution respectively, wherein the feeding pipes were located above and below a rotary disc of a multi-way switching valve system 1 (with a valve diameter of 1.5 inches, a rotation switching time of 4 h), then passed through openings and channels within the multi-way switching valve system to respectively enter corresponding resin columns 7 (filled with macroporous adsorption resin LX-20 for lithium-sodium separation, produced by XI'AN SUNRESIN NEW MATERIALS CO., LTD.), and finally discharged from a discharging pipe 8 for adsorption barren liquid, a discharging pipe 9 for first drip washing solution, a discharging pipe 10 for qualified solution, a discharging pipe 11 for second drip washing solution, a discharging pipe 12 for adsorption barren liquid for pushing back second drip washing solution, thereby completing the whole process.

The distribution of each zone was as follows:

1. Adsorption zone: the lithium-sodium separation feed solution from a tank 13 for lithium-sodium separation feed solution and the feeding pipe 2 for lithium-sodium separation feed solution entered resin columns 6 #, 7 #and 8 #(resin columns 6 #, 7 #and 8 #operated in series through the channels in the multi-way switching valve, forming a resin column N1), so that lithium ions were adsorbed on the resin, and the lithium-sodium separation adsorption barren liquid after the adsorption of lithium ions was discharged into a tank 17 for barren liquid through a discharging pipe 8 for adsorption barren liquid.

2. First washing zone: after the resin was saturated: the first drip washing solution from a tank 14 for the first drip washing solution entered resin columns 3 #, 4 #and 5 #(resin columns 3 #, 4 #and 5 #operated in series through the channels in the multi-way switching valve, forming a resin column N2) through the feeding pipe 3 for first drip washing solution to push back the lithium-sodium separation feed liquid in which lithium ions were not adsorbed to the tank 13 for lithium-sodium separation feed liquid to wait for the next adsorption.

3. Desorption zone: after the completion of first washing, the desorption solution from a tank 15 for desorption solution entered resin columns 13 #, 14 #, 15 #, 1 #and 2 #(resin columns 13 #, 14 #, 15 #, 1 #and 2 #operated in series through the channels in the multi-way switching valve, forming a resin column N3) through the feeding pipe 4 for desorption solution to desorb lithium ions adsorbed on the resin, and the desorbed lithium ion-rich desorption liquid was discharged into a tank 18 for qualified desorption liquid through the discharging pipe 10 for qualified solution.

4. Second washing zone: after the resin desorption was completed, the second drip washing solution from a tank 16 for second drip washing solution entered resin columns 10 #, 11 #and 12 #(resin columns 10 #, 11 #and 12 #operated in series through the channels in the multi-way switching valve, forming a resin column N4) through the feeding pipe 5 for second drip washing solution to recycle the unused desorption liquid in the resin column to the tank 15 for desorption liquid.

5. Zone for pushing back water by adsorption barren liquid: after the desorption was completed, the lithium-sodium separation adsorption barren liquid entered resin column 9 #(i.e. resin column N5) through feeding pipe 12 for adsorption barren liquid for pushing back second drip washing solution, the second drip washing solution in the resin column was replaced and the resin was loosened, and the replaced second drip washing solution was recycled to a tank 16 for second drip washing solution through the discharging pipe 6 for second drip washing solution.

The system had a feed flow rate of 2 t/h for the lithium-sodium separation feed solution, fifteen resin columns in total, with each column being filled with 1 m$^3$ of resin and the total amount of resin in the system being 15 m$^3$, and a switching time of 4 h. The lithium-sodium separation feed solution at inlet had a lithium ion content of 2000 ppm. After treatment by the system, the adsorption tail fluid in the lithium-sodium separation feed solution had a lithium ion content of 41 ppm, the recovery rate of lithium ion was 97.95%, and the lithium ion concentration of the qualified desorption liquid was 1.11 g/L.

Example 4

A lithium-sodium separation feed solution, pure water as first drip washing solution, 15% (w/w) sulfuric acid solution as desorption solution and pure water as second drip washing solution were passed through a feeding pipe 2 for lithium-sodium separation feed solution, a feeding pipe 3 for first drip washing solution, a feeding pipe 4 for desorption solution, a feeding pipe 5 for second drip washing solution, a feeding pipe 12 for adsorption barren liquid for pushing back washing solution respectively, wherein the feeding pipes were located above and below a rotary disc of a multi-way switching valve system 1 (with a valve diameter of 1 inch, a rotation switching time of 6 h), then passed through openings and channels within the multi-way switching valve system to respectively enter corresponding resin columns 7 (filled with macroporous adsorption resin LX-20 for lithium-sodium separation, produced by XI'AN SUN-RESIN NEW MATERIALS CO., LTD.), and finally discharged from a discharging pipe 8 for adsorption barren liquid, a discharging pipe 9 for first drip washing solution, a discharging pipe 10 for qualified solution, a discharging pipe 11 for second drip washing solution, a discharging pipe 12 for adsorption barren liquid for pushing back second drip washing solution, thereby completing the whole process.

The distribution of each zone was as follows:

1. Adsorption zone: the lithium-sodium separation feed solution from a tank 13 for lithium-sodium separation feed solution and the feeding pipe 2 for lithium-sodium separation feed solution entered resin columns 7 #, 8 # and 9 #(resin columns 7 #, 8 # and 9 # operated in series through the channels in the multi-way switching valve, forming a resin column N1), so that lithium ions were adsorbed on the resin, and the lithium-sodium separation adsorption barren liquid after the adsorption of lithium ions was discharged into a tank 17 for barren liquid through a discharging pipe 8 for adsorption barren liquid.

2. First washing zone: after the resin was saturated: the first drip washing solution from a tank 14 for the first drip washing solution entered resin columns 4 #, 5 # and 6 # (resin columns 4 #, 5 # and 6 # operated in series through the channels in the multi-way switching valve, forming a resin column N2) through the feeding pipe 3 for first drip washing solution to push back the lithium-sodium separation feed liquid in which lithium ions were not adsorbed to the tank 13 for lithium-sodium separation feed liquid to wait for the next adsorption.

3. Desorption zone: after the completion of first washing, the desorption solution from a tank 15 for desorption solution entered resin columns 14 #, 15 #, 1 #, 2 # and 3 # (resin columns 14 #, 15 #, 1 #, 2 # and 3 # operated in series through the channels in the multi-way switching valve, forming a resin column N3) through the feeding pipe 4 for desorption solution to desorb lithium ions adsorbed on the resin, and the desorbed lithium ion-rich desorption liquid was discharged into a tank 18 for qualified desorption liquid through the discharging pipe 10 for qualified solution.

4. Second washing zone: after the resin desorption was completed, the second drip washing solution from a tank 16 for second drip washing solution entered resin columns 11 #, 12 # and 13 # (resin columns 11 #, 12 # and 13 # operated in series through the channels in the multi-way switching valve, forming a resin column N4) through the feeding pipe 5 for second drip washing solution to recycle the unused desorption liquid in the resin column to the tank 15 for desorption liquid.

5. Zone for pushing back water by adsorption barren liquid: after the desorption was completed, the lithium-sodium separation adsorption barren liquid entered resin column 10 #(i.e. resin column N5) through feeding pipe 12 for adsorption barren liquid for pushing back second drip washing solution, the second drip washing solution in the resin column was replaced and the resin was loosened, and the replaced second drip washing solution was recycled to a tank 16 for second drip washing solution through the discharging pipe 6 for second drip washing solution.

The system had a feed flow rate of 2 t/h for the lithium-sodium separation feed solution, fifteen resin columns in total, with each column being filled with 1 $m^3$ of resin and the total amount of resin in the system being 15 $m^3$, and a switching time of 6 h. The lithium-sodium separation feed solution at inlet had a lithium ion content of 2000 ppm. After treatment by the system, the adsorption tail fluid in the lithium-sodium separation feed solution had a lithium ion content of 39 ppm, the recovery rate of lithium ion was 98.05%, and the lithium ion concentration of the qualified desorption liquid was 1.03 g/L.

Example 5

A lithium-sodium separation feed solution, pure water first drip washing solution, 8% (w/w) sulfuric acid solution as desorption solution and pure water as second drip washing solution were passed through a feeding pipe 2 for lithium-sodium separation feed solution, a feeding pipe 3 for first drip washing solution, a feeding pipe 4 for desorption solution, a feeding pipe 5 for second drip washing solution, a feeding pipe 12 for adsorption barren liquid for pushing back washing solution respectively, wherein the feeding pipes were located above and below a rotary disc of a multi-way switching valve system 1 (with a valve diameter of 1.5 inches, a rotation switching time of 3 h), then passed through openings and channels within the multi-way switching valve system to respectively enter corresponding resin columns 7 (filled with macroporous adsorption resin LX-20 for lithium-sodium separation, produced by XI'AN SUN-RESIN NEW MATERIALS CO., LTD.), and finally discharged from a discharging pipe 8 for adsorption barren liquid, a discharging pipe 9 for first drip washing solution, a discharging pipe 10 for qualified solution, a discharging pipe 11 for second drip washing solution, a discharging pipe 12 for adsorption barren liquid for pushing back second drip washing solution, thereby completing the whole process.

The distribution of each zone was as follows:

1. Adsorption zone: the lithium-sodium separation feed solution from a tank 13 for lithium-sodium separation feed solution and the feeding pipe 2 for lithium-sodium separation feed solution entered resin columns 8 #, 9 # and 10 # (resin columns 8 #, 9 # and 10 # operated in series through the channels in the multi-way switching valve, forming a resin column N1), so that lithium ions were adsorbed on the resin, and the lithium-sodium separation adsorption barren liquid after the adsorption of lithium ions was discharged into a tank 17 for barren liquid through a discharging pipe 8 for adsorption barren liquid.

2. First washing zone: after the resin was saturated: the first drip washing solution from a tank 14 for the first drip washing solution entered resin columns 5 #, 6 #and 7 #(resin columns 5 #, 6 #and 7 #operated in series through the channels in the multi-way switching valve, forming a resin column N2) through the feeding pipe 3 for first drip washing solution to push back the lithium-sodium separation feed liquid in which lithium ions were not adsorbed to the tank 13 for lithium-sodium separation feed liquid to wait for the next adsorption.

3. Desorption zone: after the completion of first washing, the desorption solution from a tank 15 for desorption solution entered resin columns 15 #, 1 #, 2 #, 3 #and 4 #(resin columns 15 #, 1 #, 2 #, 3 #and 4 #operated in series through the channels in the multi-way switching valve, forming a resin column N3) through the feeding pipe 4 for desorption solution to desorb lithium ions adsorbed on the resin, and the desorbed lithium ion-rich desorption liquid was discharged into a tank 18 for qualified desorption liquid through the discharging pipe 10 for qualified solution.

4. Second washing zone: after the resin desorption was completed, the second drip washing solution from a tank 16 for second drip washing solution entered resin columns 12 #, 13 #and 14 #(resin columns 12 #, 13 #and 14 #operated in series through the channels in the multi-way switching valve, forming a resin column N4) through the feeding pipe 5 for second drip washing solution to recycle the unused desorption liquid in the resin column to the tank 15 for desorption liquid.

5. Zone for pushing back water by adsorption barren liquid: after the desorption was completed, the lithium-sodium separation adsorption barren liquid entered resin column 7 #(i.e. resin column N5) through feeding pipe 12 for adsorption barren liquid for pushing back second drip washing solution, the second drip washing solution in the resin column was replaced and the resin was loosened, and the replaced second drip washing solution was recycled to a tank 16 for second drip washing solution through the discharging pipe 6 for second drip washing solution.

The system had a feed flow rate of 2 t/h for the lithium-sodium separation feed solution, fifteen resin columns in total, with each column being filled with 1 $m^3$ of resin and the total amount of resin in the system being 15 $m^3$, and a switching time of 3 h. The lithium-sodium separation feed solution at inlet had a lithium ion content of 2000 ppm. After treatment by the system, the adsorption tail fluid in the lithium-sodium separation feed solution had a lithium ion content of 48 ppm, the recovery rate of lithium ion was 97.6%, and the lithium ion concentration of the qualified desorption liquid was 0.77 g/L.

Examples 6-19

According to the relevant verification effects of Examples 1 to 5, parameters such as desorption liquid and desorption liquid concentration were adjusted, and the results were as follows (the solution concentrations in the table were all mass percent concentrations):

| Examples No. | Adsorption zone | First washing zone | Desorption zone | Second washing zone | Zone for pushing back washing solution by adsorption barren liquid | First drip washing solution | Second drip washing solution | Desorption solution | Valve diameter (inch) | Shift Time (h) | Lithium yield % | Lithium concentration of desorption solution g/L |
|---|---|---|---|---|---|---|---|---|---|---|---|---|
| 6 | 3 in series | 3 in series | 5 in series | 1 in series | 3 in series | pure water | 0.1% saline | 4% EDTA | 1 | 2.5 | 56.8 | 0.21 |
| 7 | 5 in parallel | 3 in series | 3 in series | 3 in series | 1 in series | 50% saline | pure water | 6% sodium hydroxide | 1.5 | 3 | 3.5 | 0.013 |
| 8 | 3 in series | 3 in parallel | 3 in series | 4 in series | 2 in series | 0.1% saline | pure water | 2% EDTA | 2 | 4 | 47.1 | 0.14 |
| 9 | 3 in series | 2 in series | 2 in series | 2 in series | 6 in series | desalted water | 15% saline | 7% phosphoric acid | 1.5 | 2 | 1.44 | 0.006 |
| 10 | 4 in series | 4 in series | 1 in series | 4 in series | 2 in series | pure water | pure water | 8% nitric acid | 1.5 | 10 | 95.3 | 0.67 |
| 11 | 2 in series | 3 in series | 4 in series | 2 in series | 4 in series | pure water | desalted water | 10% acetic acid | 0.5 | 24 | 37.1 | 0.27 |
| 12 | 2 in series | 3 in series | 4 in series | 2 in series | 4 in series | 0.1% hydrochloric acid | 36% hydrochloric acid | 90% acetic acid | 0.5 | 2 | 8.7 | 0.087 |
| 13 | 2 in series | 3 in series | 4 in series | 2 in series | 4 in series | 36% hydrochloric acid | 0.1% sulfuric acid | 0.1% sulfuric acid | 0.5 | 2 | 7.86 | 0.064 |
| 14 | 2 in series | 3 in series | 4 in series | 2 in series | 4 in series | 0.1% sulfuric acid | 98% sulfuric acid | 98% sulfuric acid | 0.5 | 2 | 21.7 | 0.17 |
| 15 | 2 in series | 3 in series | 4 in series | 2 in series | 4 in series | 98% sulfuric acid | desalted water | 36% hydrochloric acid | 0.5 | 2 | 46.8 | 0.29 |
| 16 | 2 in series | 3 in series | 4 in series | 2 in series | 4 in series | desalted water | 60% sulfuric acid | 0.1% hydrochloric acid | 0.5 | 2 | 4.7 | 0.031 |

-continued

| Examples No. | Adsorption zone | First washing zone | Desorption zone | Second washing zone | Zone for pushing back washing solution by adsorption barren liquid | First drip washing solution | Second drip washing solution | Desorption solution | Valve diameter (inch) | Shift Time (h) | Lithium yield % | Lithium concentration of desorption solution g/L |
|---|---|---|---|---|---|---|---|---|---|---|---|---|
| 17 | 2 in series | 3 in series | 4 in series | 2 in series | 4 in series | 15% hydrochloric acid | pure water | 30% phosphoric acid | 0.5 | 2 | 0.31 | 0.001 |
| 18 | 2 in series | 3 in series | 4 in series | 2 in series | 4 in series | pure water | 15% hydrochloric acid | 0.1% phosphoric acid | 0.5 | 2 | 0.32 | 0.001 |
| 19 | 2 in series | 3 in series | 4 in series | 2 in series | 4 in series | 10% sodium hydroxide | desalted water | 0.1% nitric acid | 0.5 | 2 | 6.94 | 0.043 |

The above-mentioned embodiments are only examples for clear description, and are not intended to limit the implementation manner. For those of ordinary skill in the art, changes or modifications in other different forms can also be made on the basis of the above description. There is no need and cannot be exhaustive of all implementations here. And the obvious changes or changes derived from this are still within the protection scope of the present invention.

The invention claimed is:

1. A method for lithium-sodium separation, comprising the following steps:
    allowing a lithium-sodium separation feed solution, first drip washing solution, desorption solution, second drip washing solution and lithium-sodium separation adsorption barren liquid to pass through a feeding pipe for lithium-sodium separation feed solution, a feeding pipe for first drip washing solution, a feeding pipe for desorption solution, a feeding pipe for second drip washing solution, a feeding pipe for adsorption barren liquid for pushing back desorption solution respectively, wherein the feeding pipes are located above and below a rotary disc of a multi-way switching valve system, then pass through openings and channels within the multi-way switching valve system to respectively enter corresponding resin columns, and finally discharge from a discharging pipe for adsorption barren liquid, a discharging pipe for first drip washing solution, a discharging pipe for qualified solution, a discharging pipe for second drip washing solution, a discharging pipe for adsorption barren liquid for pushing back desorption solution, thereby completing the whole process, wherein the resin columns are connected in series or in parallel via the channels in the multi-way switching valve system; and
    wherein the whole process comprises the following steps:
    (1) in an adsorption zone, carrying out: feeding the lithium-sodium separation feed solution from a tank for lithium-sodium separation feed solution into a resin column N1 through the feeding pipe for lithium-sodium separation feed solution to perform adsorption of lithium ions onto resin, producing a lithium-sodium separation barren liquid after the adsorption of lithium ions, and discharging the lithium-sodium separation barren liquid into a tank for barren liquid through the discharging pipe for adsorption barren liquid;
    (2) in a first washing zone, carrying out the following after the resin is saturated: feeding the first drip washing solution from a tank for the first drip washing solution into a resin column N2 through the feeding pipe for first drip washing solution to push back the lithium-sodium separation feed liquid in which lithium ions are not adsorbed to the tank for lithium-sodium separation feed liquid to wait for the next adsorption;
    (3) in a desorption zone, carrying out the following after the completion of first washing: feeding a desorption solution from a tank for desorption solution into a resin column N3 through the feeding pipe for desorption solution to desorb lithium ions adsorbed on the resin, and discharging the desorbed lithium ion-rich desorption liquid into a tank for qualified desorption liquid through the discharging pipe for qualified solution;
    (4) in a second washing zone, carrying out the following after the desorption is completed: feeding the second drip washing solution from a tank for second drip washing solution into a resin column N4 through the feeding pipe for second drip washing solution to push back the unused desorption liquid in the resin column to the tank for desorption liquid to wait for use in the next desorption step;
    (5) in a zone for pushing back water by adsorption barren liquid, carrying out the following after the completion of second washing: feeding the lithium-sodium separation adsorption barren liquid from the feeding pipe for adsorption barren liquid into a resin column N5 to replace the second drip washing solution in the resin column and loose the resin, and recycling the replaced second drip washing solution to a tank for second drip washing solution through the discharging pipe for second drip washing solution to wait for use in the next second washing step; and
    (6) setting a rotation time of the multi-way switching valve to realize shift of columns according to the process requirements.

2. The method for lithium-sodium separation of claim 1, wherein the resin columns are filled with macroporous adsorption resins.

3. The method for lithium-sodium separation of claim 1, wherein the first dripwashing solution is selected from the group consisting of pure water, 0.1-50% (w/w) saline solution, 0.1-36% (w/w) hydrochloric acid solution, 0.1-50% (w/w) sodium hydroxide solution, and any mixture thereof.

4. The method for lithium-sodium separation of claim 3, wherein the first drip washing solution is one of pure water, 0.2-0.6% (w/w) saline solution, 0.1-0.6% (w/w) hydrochloric acid solution and 0.1-0.6% (w/w) sodium hydroxide solution.

5. The method for lithium-sodium separation of claim 4, wherein the first drip washing solution is one of pure water and 0.5% (w/w) hydrochloric acid solution.

6. The method for lithium-sodium separation of claim 5, wherein the first drip washing solution is pure water.

7. The method for lithium-sodium separation of claim 1, wherein the desorption solution is selected from the group consisting of ethanol, methanol, acetone, isopropanol, hydrochloric acid solution, sulfuric acid solution, phosphoric acid solution, acetic acid solution, EDTA solution, sodium hydroxide solution, and any mixture thereof.

8. The method for lithium-sodium separation of claim 7, wherein the desorption solution is 2-10% (w/w) hydrochloric acid solution or 5-15% (w/w) sulfuric acid solution.

9. The method for lithium-sodium separation of claim 8, wherein the desorption solution is 4-10% (w/w) hydrochloric acid solution or 8-15% (w/w) sulfuric acid solution.

10. The method for lithium-sodium separation of claim 9, wherein the desorption solution is 8% (w/w) hydrochloric acid solution or 10% (w/w) sulfuric acid solution.

11. The method for lithium-sodium separation of claim 1, wherein the second drip washing solution is selected from the group consisting of pure water, 0.1-50% (w/w) saline solution, 0.1-36% (w/w) hydrochloric acid solution, 0.1-50% (w/w) sodium hydroxide solution, and any mixture thereof.

12. The method for lithium-sodium separation of claim 11, wherein the second drip washing solution is one of pure water, 0.2-0.6% (w/w) saline solution, 0.1-0.6% (w/w) hydrochloric acid solution and 0.1-0.6% (w/w) sodium hydroxide solution.

13. The method for lithium-sodium separation of claim 12, wherein the second drip washing solution is pure water or 0.5% (w/w) hydrochloric acid solution.

14. The method for lithium-sodium separation of claim 5, wherein the second drip washing solution is pure water.

15. The method for lithium-sodium separation of claim 5, wherein the rotation shift time of the multi-way switching valve system is 0.01-24 hours.

16. The method for lithium-sodium separation of claim 1, wherein comprising the following steps:
   (1) feeding the lithium-sodium separation feed solution at a flow rate of 5 BV/h into the resin column N1 of the multi-way switching valve device to perform adsorption of lithium in the feed liquid by the resin in the resin column, and discharging out the resulted adsorption barren liquid from the device;
   (2) after the resin is saturated, feeding pure water at a flow rate of 2 BV/h into the resin column N2 to push back the lithium-sodium separation feed liquid in which lithium ions are not adsorbed to the tank for lithium-sodium separation feed liquid to wait for the next adsorption;
   (3) after the washing with pure water is completed, feeding 8% (w/w) hydrochloric acid solution at a flow rate of 2 BV/h into the resin column N3 to desorb lithium ions adsorbed on the resin, and discharging the desorbed lithium ion-rich desorption liquid into a tank for qualified desorption liquid;
   (4) after the desorption is completed, pushing back the unused desorption liquid in the resin column N4 using pure water to the tank for desorption liquid to wait for use in the next desorption step; and
   (5) setting the multi-way switching valve to have a shift time of 30 min.

\* \* \* \* \*